United States Patent
Vestergaard et al.

(10) Patent No.: US 11,713,747 B2
(45) Date of Patent: Aug. 1, 2023

(54) WIND TURBINE CONTROL METHOD

(71) Applicant: VESTAS WIND SYSTEMS A/S, Aarhus N (DK)

(72) Inventors: Jakob Vestergaard, Aarhus C (DK); Anders Steen Nielsen, Højbjerg (DK); Juan Pablo Murcia, København N (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 9 days.

(21) Appl. No.: 17/054,152

(22) PCT Filed: May 2, 2019

(86) PCT No.: PCT/DK2019/050134
§ 371 (c)(1),
(2) Date: Nov. 9, 2020

(87) PCT Pub. No.: WO2019/214785
PCT Pub. Date: Nov. 14, 2019

(65) Prior Publication Data
US 2021/0123416 A1    Apr. 29, 2021

(30) Foreign Application Priority Data
May 4, 2018    (DK) ............................ PA 2018 70273

(51) Int. Cl.
*F03D 7/04* (2006.01)
*F03D 7/02* (2006.01)

(52) U.S. Cl.
CPC .......... *F03D 7/045* (2013.01); *F03D 7/0292* (2013.01); *F05B 2270/332* (2013.01)

(58) Field of Classification Search
CPC .. F03D 7/045; F03D 7/0292; F05B 2270/332; Y02E 10/72
See application file for complete search history.

(56) References Cited

U.S. PATENT DOCUMENTS 9,822,762 B2 *   11/2017   Kooijman ............. F03D 7/0292
10,907,611 B2 *   2/2021   Spruce ................. G05B 19/048
(Continued)

FOREIGN PATENT DOCUMENTS

EP          3093486 A1    11/2016
WO      2010069318 A1     6/2010
(Continued)

OTHER PUBLICATIONS

PCT International Search Report for Application No. PCT/DK2019/050134 dated Oct. 7, 2019.
(Continued)

*Primary Examiner* — Brian P Wolcott
(74) *Attorney, Agent, or Firm* — Patterson + Sheridan, LLP (57) ABSTRACT

A method of operating a wind turbine. The wind turbine is operated over an operating period in accordance with a control strategy. A sensor signal is received over the operating period from a sensor measuring an operational parameter of the turbine. A model is used to obtain a modelled fatigue value based on the sensor signal. The modelled fatigue value provides an estimate of fatigue loading applied to a component of the turbine over the operating period. The control strategy is modified based on the modelled fatigue value.

16 Claims, 4 Drawing Sheets

(56) References Cited

U.S. PATENT DOCUMENTS

| | | | |
|---|---|---|---|
| 10,928,816 B2* | 2/2021 | Spruce | G06F 30/17 |
| 11,017,315 B2* | 5/2021 | Kim | F03D 7/048 |
| 2015/0003983 A1 | 1/2015 | Coultate | |
| 2015/0167637 A1* | 6/2015 | Kooijman | F03D 7/02 |
| | | | 416/61 |
| 2017/0286572 A1* | 10/2017 | Hershey | B64F 5/60 |

FOREIGN PATENT DOCUMENTS

| | | |
|---|---|---|
| WO | 2016188532 A1 | 12/2016 |
| WO | 2017000957 A1 | 1/2017 |
| WO | 2019214785 A1 | 11/2019 |

OTHER PUBLICATIONS

Hammerum K et al., "A Fatigue Approach to wind turbine control," Journal of Physics: Conference Series, Institute of Physics Publishing, Brisol, GB, vol. 75, No. 1, Jul. 1, 2007, p. 12081, XP02012514.

PCT Written Opinion of the International Searching Authority for Application No. PCT/DK2019/050134 dated Oct. 7, 2019.

Danish Patent and Trademark Office 1st Technical Examination for Application No. PA 2018 70273 dated Oct. 30, 2018.

European Patent Office, Communication pursuant to Article 94(3) EPC for Application 19 723 004.8-1002 dated Sep. 21, 2022.

Vera-Tudela Luis et al: "Analysing wind turbine fatigue load prediction: The impact of wind farm flow conditions", Renewable Energy, vol. 107, pp. 352-360.

Cosack Nicolai: "Fatigue Load Monitoring with Standard Wind Turbine Signals", Apr. 7, 2010 (Apr. 7, 2010), pp. 1-243.

* cited by examiner

WIND TURBINE CONTROL METHOD

FIELD OF THE INVENTION

The present invention relates to control of a wind turbine, and in particular it relates to control of a wind turbine based on fatigue load values.

BACKGROUND OF THE INVENTION

When siting a wind turbine or wind farm, it is conventional to first measure the weather conditions at the proposed site. From these measurements, the fatigue loading that the turbine will experience is predicted, and a control strategy for operating the turbine over its lifetime is devised. The devised control strategy may include static control features such as wind sector operational modes, which may for example set turbine operation in a given sector or shut down a turbine in a given sector. The devised control strategy may be designed to balance the turbine lifetime, operational expenditure, and annual energy production. The turbine is then constructed, and operated based on the control strategy for its pre-determined lifetime, which may be between 20-25 years.

However, pre-determining a control strategy for such a long period does not allow the actual site conditions during operation of the turbine to be accounted for in the general control strategy of the turbine.

It is against this background that the invention has been devised.

SUMMARY OF THE INVENTION

In a first aspect, there is provided a method of operating a wind turbine, the method comprising:
  operating the wind turbine over an operating period in accordance with a control strategy;
  receiving a sensor signal over the operating period from a sensor measuring an operational parameter of the turbine;
  using a model to obtain a modelled fatigue value based on the sensor signal, wherein the modelled fatigue value provides an estimate of fatigue loading applied to a component of the turbine over the operating period; and
  modifying the control strategy based on the modelled fatigue value.

By modelling the fatigue loading based on actual operational measurements, as measured by the sensor, the control strategy may be optimised for the actual operational parameters experienced by the turbine. For example, the control strategy in terms of power curve, thrust limits, possibly in a wind sector management scheme, may be adjusted.

The sensor may be a strain gauge, but strain gauges can be expensive. Therefore, preferably the sensor is not a strain gauge.

Optionally the modelled fatigue value is obtained by deriving statistical data from the sensor signal, and inputting the statistical data into the model to obtain the modelled fatigue value. For example, the statistical data may include one or more of the mean, maximum value, minimum value, standard deviation, rainflow count statistics, load duration/revolution distribution statistics of the operational parameter over the operating period. The operational parameter may exhibit cyclic variations over the operating period. Deriving statistical data may be computationally more efficient than recording and using the full variation of the operational parameter over time.

In some embodiments, the model may be a surrogate model. The surrogate model may comprise a response surface that predicts a fatigue value when given the sensor signal (or a set of sensor signals, each relating to a different operational parameter) as an input. Using a surrogate model may provide a computationally efficient method for predicting fatigue values.

The method may further comprise training the surrogate model using training data. Training the model using training data may comprise running a machine learning algorithm based on training data.

In some such embodiments, the surrogate model may be trained using simulated training data from an aero-elastic turbine load simulation. An aero-elastic load simulation is typically based on blade element momentum theory (BEM), which models the rotor aerodynamics, and a structural model of the turbine and a control system. The input to the simulation may be a representation of turbulent flow of the wind based on a turbulence model. The output of the simulation may be the turbine response, for example blade deflections, rotation speed or acceleration, loads, and power production. Previously recorded statistical data, for example from other turbines or turbine farms, may be used as an input to the simulation. The simulation may output a predicted fatigue value based on this input. The simulation may be verified using strain gauges on a prototype turbine. By using such a simulation, a large amount of data may be generated to train the surrogate model, ensuring the surrogate model is able to accurately estimate fatigue loading when used with real measurements.

In some embodiments, the method may comprise determining if the modelled fatigue value differs from an expected fatigue value; and modifying the control strategy based on the modelled fatigue value if the modelled fatigue value differs from the expected fatigue value.

For example, the method may comprise estimating a lifetime fatigue for the turbine before operating the turbine over the operating period; determining an expected fatigue value for the operating period based on the lifetime fatigue and the duration of the operating period; and comparing the modelled fatigue value to the expected fatigue value to determine if the modelled fatigue value differs from the expected fatigue value. In this way, it is possible to determine whether the fatigue loading experienced by the turbine due to actual operational parameters is higher or lower than the fatigue loading that would be expected at that point of the turbine lifetime.

In particular embodiments, modifying the control strategy may comprise modifying the control strategy to reduce a difference between the modelled fatigue value and the expected fatigue value.

A fatigue utilisation measure, such as a utilisation ratio, may be defined based on a difference or ratio between the modelled fatigue value and the expected fatigue value.

In some embodiments, the operating period comprises a plurality of operating intervals, and the modelled fatigue value is an accumulated modelled fatigue value obtained by using the model to obtain an interval fatigue value for each operating interval based on a sensor signal for that interval, and summing the interval fatigue values for each operating interval. Thus the modelled fatigue value over the operating period may represent an accumulated modelled fatigue value across the plurality of operating intervals.

The operational parameter may comprise a wind parameter such as wind speed.

The operational parameter may comprise at least one of: wind speed, tower accelerations, rotor speed, blade pitch angle, active power, and blade root bending moment. Measuring values for such operational parameters may be relatively inexpensive compared to directly measuring fatigue loading with strain gauges. The sensor may measure one or more operational parameters; or multiple sensors may be used, each measuring an operational parameter.

The model may be used to obtain only a single modelled fatigue value which provides an estimate of fatigue loading applied to only a single component of the turbine over the operating period. Alternatively the model may be used to obtain multiple modelled fatigue values, each providing an estimate of fatigue loading applied to a respective different component of the turbine over the operating period. For example, the model may be used to obtain modelled fatigue values for blade flat/edge wise moments, drivetrain torque, drivetrain bending moments, and/or tower bending moments.

Modifying the control strategy may comprises adjusting a control setting of the turbine (such as a power setting or a speed setting) based on the modelled fatigue value/s.

In a particular embodiment, modifying the control strategy may comprise adjusting a tilt yaw control gain of the wind turbine. Adjusting the control gain may reduce blade pitch activity, increasing blade bearing lifetime.

Modifying the control strategy may additionally or alternatively comprise adjusting at least one of: an expected lifetime of the turbine; an operational mode of the turbine; a power setting of the turbine; and a speed setting of the turbine.

According to a second aspect there is provided a wind turbine control system adapted to perform the method of any embodiment of the first aspect. The wind turbine control system may comprise a controller arranged to receive the sensor signal from the sensor.

In general, a controller may be a unit or collection of functional units which comprises one or more processors, input/output interfaces(s) and a memory capable of storing instructions which can be executed by a processor.

According to a third aspect there is provided a wind turbine comprising a wind turbine control system according to the second aspect.

According to a fourth aspect there is provided a computer program product comprising software code adapted to control a wind turbine when executed on a data processing system, the computer program product being adapted to perform the method of any embodiment of the first aspect.

The computer program product may be provided on a computer readable storage medium or it may be downloadable from a communication network. The computer program product comprise instructions to cause a data processing system, e.g. in the form of a controller, to carry out the instructions when loaded onto the data processing system.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which:

FIG. 3b illustrates a curve fit to the training data of FIG. 3a;

DESCRIPTION OF EMBODIMENTS

Figure 1:
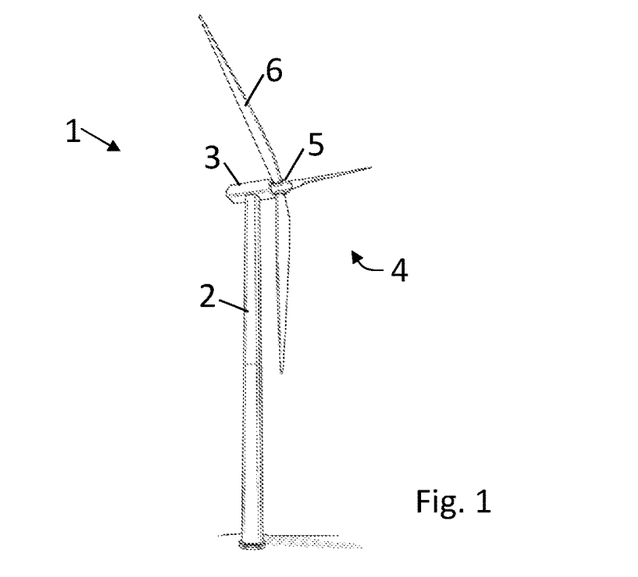
FIG. 1 illustrates an example of a wind turbine.

FIG. 1 illustrates, in a schematic perspective view, an example of a wind turbine 1. The wind turbine 1 includes a tower 2, a nacelle 3 at the apex of the tower, and a rotor 4 operatively coupled to a generator housed inside the nacelle 3. In addition to the generator, the nacelle houses miscellaneous components required for converting wind energy into electrical energy and various components needed to operate, control, and optimize the performance of the wind turbine 1. The rotor 4 of the wind turbine includes a central hub 5 and a plurality of blades 6 that project outwardly from the central hub 5. In the illustrated embodiment, the rotor 4 includes three blades 6, but the number may vary. Moreover, the wind turbine comprises a control system. The control system may be placed inside the nacelle or distributed at a number of locations inside the turbine and communicatively connected.

The wind turbine 1 may be included among a collection of other wind turbines belonging to a wind power plant, also referred to as a wind farm or wind park, that serve as a power generating plant connected by transmission lines with a power grid. The power grid generally consists of a network of power stations, transmission circuits, and substations coupled by a network of transmission lines that transmit the power to loads in the form of end users and other customers of electrical utilities.

Figure 2:
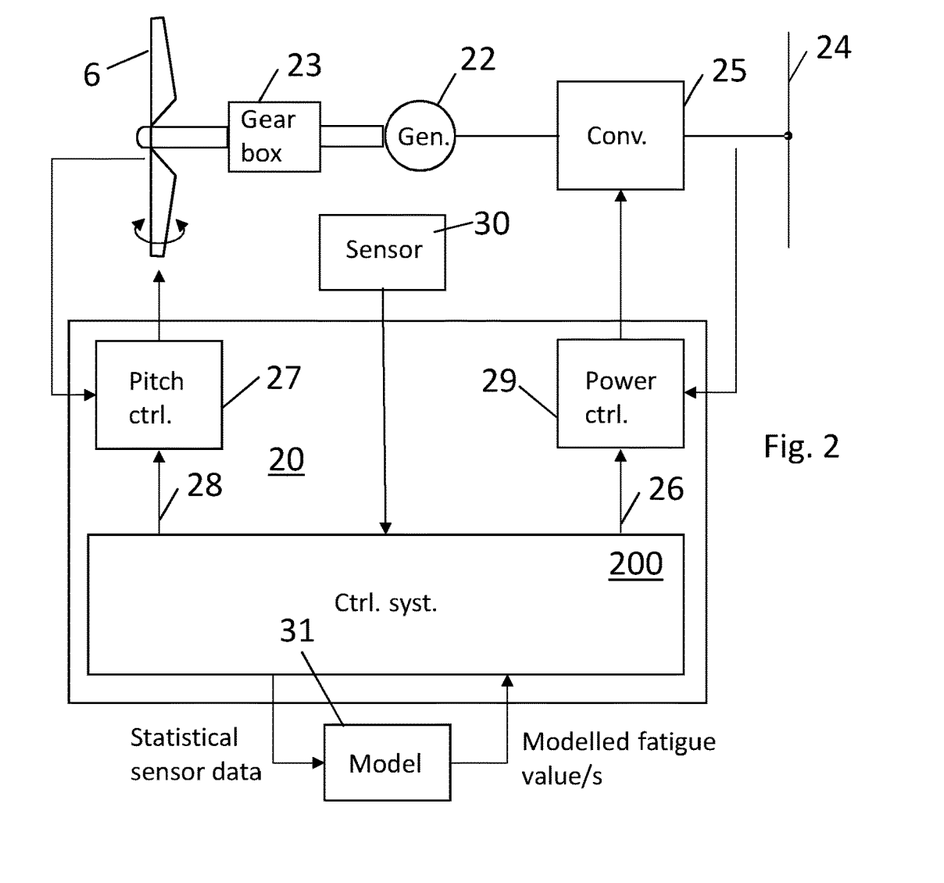
FIG. 2 illustrates an embodiment of a control system together with elements of a wind turbine.

FIG. 2 schematically illustrates an embodiment of a control system 20 together with elements of a wind turbine. The wind turbine comprises rotor blades 6 which are mechanically connected to an electrical generator 22 via gearbox 23. In direct drive systems, and other systems, the gearbox 23 may not be present. The electrical power generated by the generator 22 is injected into a power grid 24 via an electrical converter 25. The electrical generator 22 and the converter 25 may be based on a full scale converter (FSC) architecture or a doubly fed induction generator (DFIG) architecture, but other types may be used.

The control system 20 comprises a number of elements, including at least one main controller 200 with a processor and a memory, so that the processor is capable of executing computing tasks based on instructions stored in the memory. In general, the wind turbine controller ensures that in operation the wind turbine generates a requested power output level. This is obtained by adjusting the pitch angle of the blades 6 and/or the power extraction of the converter 25. To this end, the control system comprises a pitch system including a pitch controller 27 using a pitch reference 28, and a power system including a power controller 29 using a power reference 26. The wind turbine rotor comprises rotor blades that can be pitched by a pitch mechanism. The rotor may comprise a common pitch system which adjusts all pitch angles on all rotor blades at the same time, as well as in addition thereto an individual pitch system which is capable of individual pitching of the rotor blades. The control system, or elements of the control system, may be placed in a power plant controller (not shown) so that the turbine may be operated based on externally provided instructions.

Conventionally, turbines are operated in accordance with a lifetime control strategy, determined before operation of the turbine begins. The lifetime control strategy is based on models with known limitations for estimating the actual site conditions, and is based on static control features such as wind sector operational modes.

The present invention provides a method of controlling a wind turbine in which the control strategy is modified, during the course of operation of the turbine, based on a modelled actual fatigue value sustained by the turbine—i.e. a fatigue value estimated based on real measurement data. Such adaptive control of turbines enables balancing lifetime, operational expenditure (OPEX) and Annual Energy Production (AEP), resulting in a more optimal turbine control in relation to the actual site conditions.

Modelling Fatigue Value

A surrogate model 31 is used to obtain a modelled fatigue value based on a sensor signal. The surrogate model 31 receives, as an input, measurement data from a sensor 30 on or associated with the turbine. The sensor 30 measures one or more operational parameters experienced by the turbine. The operational parameters may include wind speed, tower acceleration, rotor speed, blade pitch angle, active power, and/or measured blade root bending moment.

The sensor 30 may be a sensor which is part of a Supervisory Control And Data Acquisition ("SCADA") system. SCADA systems are large-scale, distributed measurement and control systems, generally used to monitor or control chemical, physical or transport processes, where the term SCADA usually refers to the central system that monitors and controls a complete site.

The surrogate model 31 outputs one or more modelled fatigue values. Each modelled fatigue value provides an estimate of fatigue loading applied to a component of the turbine over a period of time. The surrogate model may provide estimates of the fatigue loading that would be measured by strain gauges on the component of the turbine. For example, the surrogate model may provide estimates of fatigue loading caused by blade flap/edge-wise moments; drivetrain torque; drivetrain bending moments (e.g. bending of drivetrain in vertical or horizontal directions); and/or tower bending moments. The output may be expressed as a rainflow count and/or load duration and/or revolution distribution. The output may be a fatigue value determined from such estimated load values. For example, the Palmgren-Miner linear damage hypothesis (Miner's rule) may be used to transform cyclic variations in the estimated load values into a measure of the fatigue loading.

The surrogate model may be created by using machine learning techniques to build a response surface that predicts the fatigue value/s for the given sensor input. The surrogate model response surface may be trained with training data created by a simulation tool. For example, an aero-elastic turbine load simulation tool may be used. The simulations may make use of commonly available packages such as Flex5 or HAWC2, as would be familiar to those skilled in the art. The aero-elastic simulation may be used to predict fatigue values that would result from a large set of varying operational parameters. These predicted fatigue values are used to train the surrogate model by applying a machine learning algorithm, as would be understood by those skilled in the art.

Once the surrogate model has been created, it can be used to estimate, or model, the fatigue loading experienced by an individual turbine component based on real measurement data from the sensor 30.

To avoid the operational and computation costs that would be required to fully record the variation of operational parameters across an operating period, statistical data based on measurements may be input into the surrogate model, rather than raw sensor data. The statistical data may be a statistical representation of the operational parameter experienced by the turbine over that operating period. For example, a mean, maximum value, minimum value, standard deviation, rainflow count, load duration and/or load distribution may be determined over the operating period, and fed into the surrogate model.

The fatigue value may be modelled for only a single operating period, or for multiple operating periods (i.e. a series of operating intervals). The operating period may for example have a duration of between 5 minutes and 15 minutes, or may be 10 minutes, or may be between 1 second and 10 seconds. Any other duration of operating period may be used. The modelled fatigue value may be obtained online, i.e. in real time immediately after the end of the respective operating period. The modelled fatigue value may alternatively be obtained offline, based on logged sensor data.

Figure 3A:
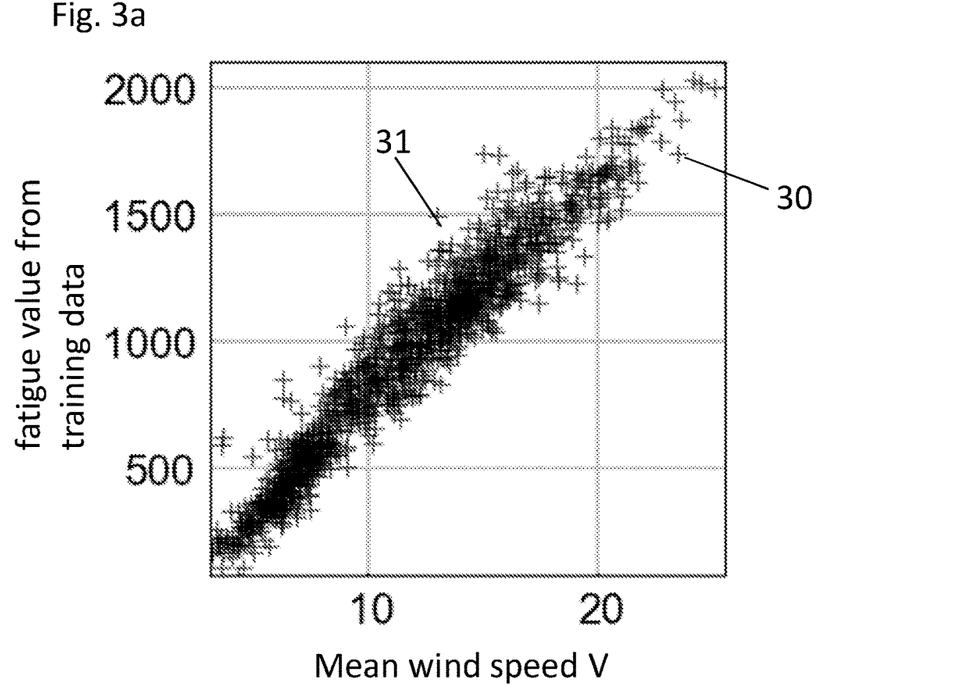
FIG. 3a illustrates a set of training data which may be used to train a surrogate model.
Figure 3B:
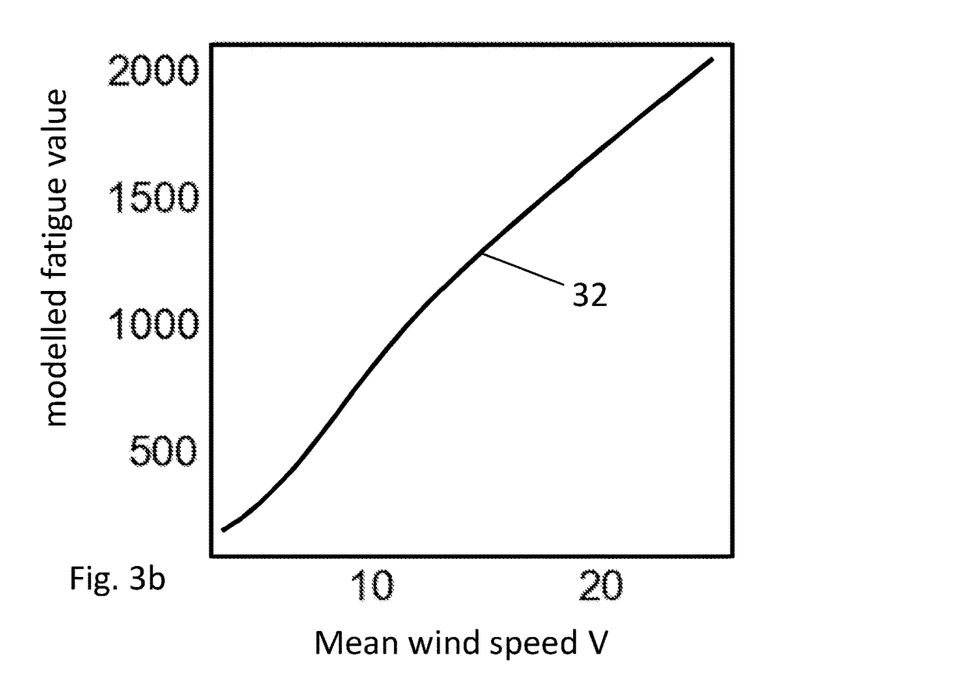

FIGS. 3a and 3b give an example of how the surrogate model can be trained based on training data from an aero-elastic simulation. FIG. 3a shows a set of training data. The x-axis of FIG. 3a represents the value of a particular operational parameter over the simulated operating period—in this case mean wind speed V.

The y-axis of FIG. 3a represents the fatigue value from the training data, determined by an aero-elastic simulation. In this example, the fatigue value represent the fatigue tilt load at the main bearing of the wind turbine.

Each data point in FIG. 3a, represented by a cross, represents a fatigue value which is calculated by inputting a data set into the aero-elastic simulation, the data set representing the variation of the operational parameter (in this case—the wind speed V) over a simulated operating period. The aero-elastic simulation then process the data set to determine tilt load at the main bearing, then Miner's rule is used to calculate the fatigue value for that operating period. The mean wind speed V of the data set input into the aero-elastic simulation is then associated with a particular fatigue value to generate a data point in the training data set. For example the data point 30 in FIG. 3a shows a fatigue value of about 1750 associated with a mean wind speed V of about 26, and the data point 31 shows a fatigue value of about 1500 associated with a mean wind speed V of about 13.

The training data represented in FIG. 3a is then used to train the surrogate model 31. Specifically—a machine learning algorithm analyses the training data to identify a correlation between sets of operational parameters and fatigue values, which can then be used to predict fatigue loading when sensor data from a real wind turbine is input into the surrogate model. In particular, the machine learning algorithm may identify correlations between particular operational parameters and fatigue values. The surrogate model may thus be trained with those operational parameters that most closely correlate with fatigue values in the training data.

Using the example shown in FIG. 3a, there is a correlation between the mean wind speed V and the fatigue value, and the machine learning algorithm fits a curve 32 to the training data as shown in FIG. 3b. This curve 32 is, in effect, a one-dimensional surrogate model which can be used to map any value of mean wind speed V to a modelled fatigue value, which in turn provides an estimate of fatigue loading applied to the main bearing of the turbine over the operating period.

The process illustrated in FIGS. 3a and 3b can then be repeated based on another operational parameter to generate a two-dimensional response surface (a two-dimensional equivalent of the curve 32), and so on into higher dimensions.

In practice, many different sets of input and output variables will be simulated by the aero-elastic simulation to train the surrogate model. The surrogate model uses all the sets of data, forming a multidimensional response surface, rather than the simple curve 32 in the one-dimensional example of FIG. 3b.

Preferably, a set of a plurality of operational parameters, as measured by a plurality of sensors associated with the turbine, is input into the surrogate model. For example, a set of sensor signals representing two, three, five, or more operational parameters may be used. Using more operational parameters allows a more accurate modelled fatigue value to be obtained.

Comparing the Modelled Fatigue Value to an Estimated Fatigue Value

The modelled fatigue value, as described above, can be compared to an expected fatigue value for the turbine at that point in the turbine's lifetime. In a particular embodiment, a utilisation ratio may be determined, to aid comparison of the modelled fatigue value with an expected fatigue value. The utilisation ratio may represent the accumulated fatigue loading experienced by the turbine since the start of operation— i.e. it may represent the sum of the modelled fatigue values for a plurality of operating intervals.

A fatigue value utilisation ratio may be defined as the 'actual' modelled fatigue value divided by the expected fatigue value at that point in the expected lifetime of the turbine. The expected lifetime may be the lifetime of the turbine as estimated before operation of the wind turbine began, based on the initial control strategy.

If x is the total time of operation so far, then the wind turbine has been operated over an operating period from time zero to time x. This operating period is made up of a plurality of operating intervals. For example if x is one day, and each operating interval has a duration of 10 minutes, then the operating period so far comprises 144 operating intervals. The surrogate model 31 outputs an interval fatigue value for each 10 minute interval based on a sensor signal over that interval. An accumulated fatigue value is obtained by summing the interval fatigue values for each operating period—in other words by keeping a running total of the interval fatigue values output by the surrogate model 31. So in the example above, an accumulated modelled fatigue value is obtained 1w summing the previous 144 outputs of the surrogate model.

The utilisation ratio (UR) can then be calculated as:

$$UR = \frac{d_x}{\left(\frac{x}{T}\right) * d_T}$$

where x is the total time of operation so far; T is the total expected (design) lifetime; $d_x$ is the accumulated modelled fatigue value at time x—i.e. the sum of the interval fatigue values output by the surrogate model 31 over the operating period from time zero to time and $d_T$ is the design fatigue value. The design fatigue value is the expected fatigue value at the end of the expected lifetime (time T), as predicted before operation of the turbine begins.

Utilisation ratios can be calculated for the turbine as a whole, or separate utilisation ratios may be defined for one or more components of the turbine, such as utilisation ratios representing accumulated blade flap/edge-wise moments; drivetrain torque; drivetrain bending moments (tilt/yaw); and/or tower bending moments. In the case of separate utilisation ratios, $d_x$ in the UR equation is the accumulated modelled fatigue value at time x just for that particular component/load; and $d_T$ is the design fatigue value just for that particular component/load.

Figure 4:
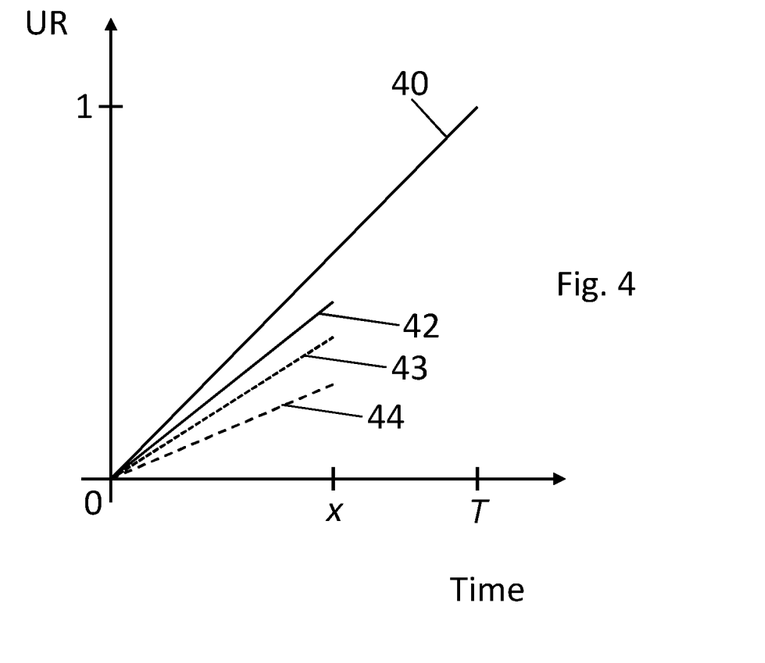
FIG. 4 illustrates example utilisation ratio curves.

FIG. 4 illustrates component URs for an example turbine after a period of operation x. Line 40 in FIG. 4 represents a UR curve that would be expected based on the design fatigue value and expected lifetime of the turbine, as predicted before operation of the turbine began. The expected UR curve 40 reaches a value of 1 at the end of the design lifetime, T, indicating that the turbine has sustained all the fatigue loading it is designed to bear.

Lines 42-44 represent component UR curves over the operating period up to time x, based on modelled fatigue values output by the surrogate model 31. In this example, each of the lines 42-44 lies below the expected UR curve 40, indicating that each component has experienced less fatigue loading than was expected, Thus the turbine has an unused potential for sustaining fatigue loading, which provides the opportunity to modify the control strategy as described in more detail below.

Line 42 represents the component of the wind turbine with the largest modelled utilisation ratio to date. This line represents the component that has the least potential for sustaining additional fatigue loading, and so may be particularly important for modifying the control strategy.

If, on the other hand, any of the component utilisation ratios were higher than the expected UR curve 40, this would indicate that the component had sustained more fatigue loading than expected at that point in the turbine's life. Modifying the control strategy may in this case seek to reduce future fatigue loading, at least for that component.

Although utilisation ratios may be particularly useful to compare the modelled fatigue value to the expected fatigue value, other comparison measures may be used. For example, a simple difference between the modelled fatigue value and an expected fatigue value may be calculated, and the control strategy modified based on this difference.

Modifying the Control Strategy

By comparing the modelled fatigue value sustained by the turbine to the fatigue value expected at that point in the turbine lifetime, for example using utilisation ratios, unused potential for sustaining fatigue loading can be identified. The overall control strategy of the turbine can be modified to make use of this unused potential. This may ensure the turbine is used optimally across its lifetime, for example extracting maximal energy whilst minimising operational expenditure.

Figure 5:
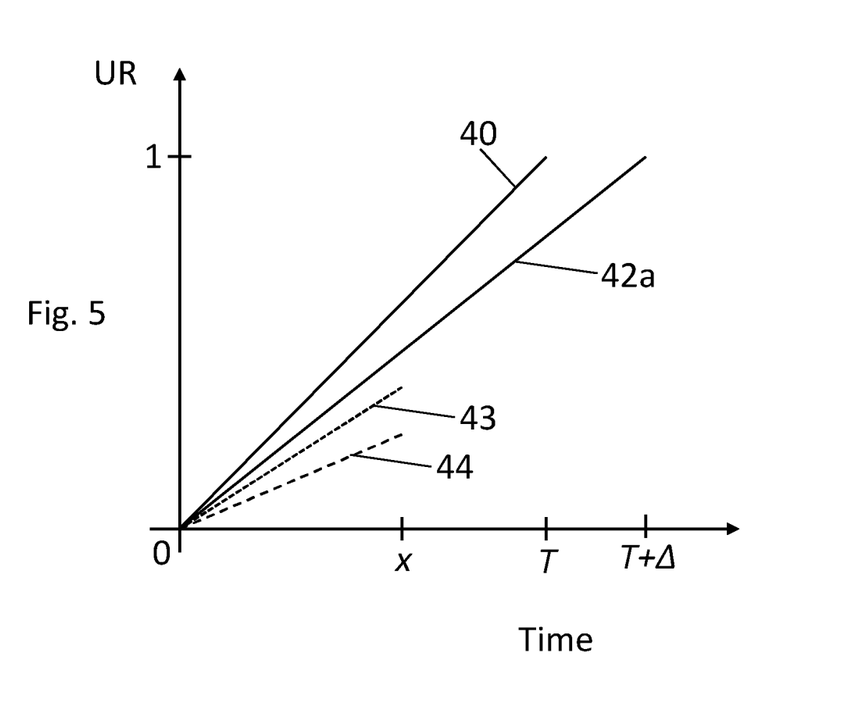
FIG. 5 illustrates a modified control strategy in which an expected lifetime of the turbine is adjusted.

A possible modification is to adjust the working lifetime of the turbine. Conventionally, the lifetime of a turbine is estimated before operation commences, in combination with determining a lifetime control strategy. However, if the modelled fatigue value demonstrates that there is potential for sustaining additional fatigue loading, the lifetime may be extended. For example, where utilisation ratios have been calculated and plotted as in FIG. 4, the modelled UR curves may be extrapolated out in time until a UR of 1 is reached, as indicated by extrapolated UR curve 42a in FIG. 5. The operational time T+Δ at which the extrapolated UR curve 42*a* reaches 1 can be taken as the new estimated lifetime of the turbine. For example, the time left in operation may be calculated as: time (e.g. in years) left=T/UR−x. The extended lifetime operation may be performed for a total turbine UR, or for the maximal component UR (i.e. line 42 in FIG. 4).

Modifying the lifetime of the turbine may comprise calculating a new expected lifetime for the turbine based on the modelled fatigue values, and updating a record of the expected lifetime of the turbine with the new expected lifetime. The record of the expected lifetime may be stored on an external storage device, such as a storage device associated with a remote network. For example, the external storage device may store a database which associates a plurality of turbines with respective expected lifetime values. The turbine (or a controller of the turbine) may communicate with the external storage device via a wired or wireless communications link to update the expected lifetime value for that turbine in the database.

Additionally or alternatively, the operation of a particular component may be adjusted. For example, a pitch response control gain may be adjusted based on an estimated component fatigue utilization ratio. A pitch response control gain may be relevant for so-called tilt-yaw control (TYC), this control gain is also referred to as the TYC gain. The objective of tilt yaw control is to reduce the out-of-plane loads experienced by the main bearing, i.e. the so-called tilt and yaw loads, by introducing a cyclic pitch (also sometimes referred to as individual pitch) which counteracts out-of-plane loads on the main bearing experienced by the turbine (and also reduces to some extent blade fatigue values). The cyclic pitching of the TYC control results in increased wear on the blade bearing due to the increased pitch activity. If the UR curve/s that are affected by TYC control are below the expected value, the TYC gain (amplitude of the cyclic pitch) can be reduced. This results in less pitch activity, and hence increased blade bearing lifetime. This in turn reduces of operational expenditure costs of operating the turbine.

The adjustment to the TYC gain may be constrained by the expected UR curve line 40 in FIG. 4)—i.e. the TYC gain can be adjusted such that the associated modelled tilt/yaw UR curves approach the expected UR curve. Alternatively, if a tilt/yaw UR curve is not the highest of the modelled. UR curves (i.e. not line 42 in FIG. 4), the TYC gain may be adjusted until the tilt/yaw UR is the highest of the modelled UR curves.

Modifying the control strategy may additionally or alternatively comprise adjusting an operation setting of the turbine, for example a wind sector operational mode, based on the modelled fatigue values or corresponding utilization ratio. In particular, this may comprise adjusting the power and speed settings of the turbine.

Typically, turbines have different operational modes available, i.e. modes with alternative power and speed settings. The motivation for having these modes is to be able to tailor the operation of the turbine to a specific site, e.g. to take advantage of wind sectors with benign conditions by running the turbine in a more aggressive mode (i.e. high power and/or speed), or reduce the fatigue loading of the turbine in wind sectors with harsh conditions (i.e. low speed and/or power). These modes are conventionally chosen based on pre-construction siting load predictions, and the turbines are normally operated with these settings throughout the turbine lifetime. In the present invention, however, if the estimated UR curves show an unused potential for additional fatigue loading, these settings can be modified. In particular, where there is unused potential, a more aggressive mode may be selected for future operation. Conversely, if it is determined that the turbine has experienced a greater fatigue loading than expected, a less aggressive mode may be selected.

Modifying the control strategy may additionally or alternatively comprise adjusting a damping control setting based on modelled tower fatigue values or corresponding utilization ratios. A damping control setting may be a control setting which affects the damping provided by the turbine, or components of the turbine. For example, the damping control setting may be a pitch control. The damping may be a side-side tower damping (SSTD) and/or forward-after tower damping (FATD). The damping control may be a pitch response gain value, or an activation threshold defining conditions under which the pitch-controlled damping is enabled. Thus, if the estimated UR curves affected by SSTD or FATD (for example tower load UR curves) are found to be below the expected UR curve, the pitch activity that is used to lower tower loads can be reduced. This may increase the blade bearing lifetime, and hence reduce OPEX costs.

Figure 6:
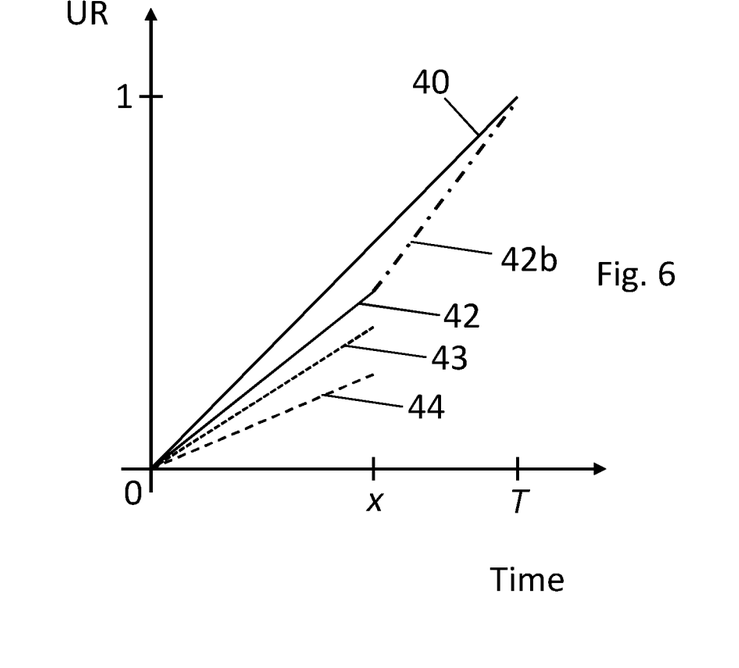
FIG. 6 illustrates a modified control strategy in which a control setting of the turbine is adjusted.

FIG. 6 gives an example in which the control strategy associated with UR curve 42 is modified at time x to become more aggressive, so that the utilisation ratio is expected to follow curve 42*b* in the future—reaching a utilisation ratio of 1 at time T.

Any combination of the above control strategies may be used to optimise lifetime, OFEX, and annual energy production of the turbine.

Figure 7:
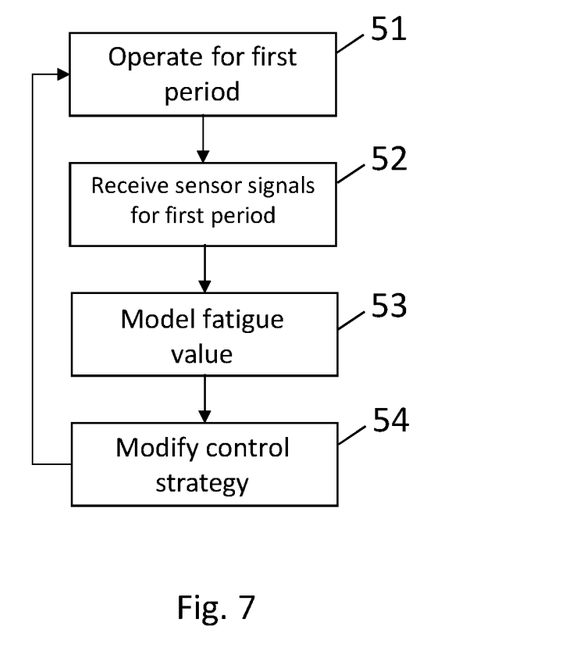
FIG. 7 illustrates a method of controlling a wind turbine.

FIG. 7 illustrates a method of controlling a wind turbine according to an embodiment of the present invention.

At step 51, the wind turbine is operated for a first operating period in accordance with a control strategy. In particular the control strategy may be an initial control strategy, determined before operation of the turbine began.

At step 52, one or more sensor signals are received over the first operating period from one or more sensors measuring operational parameters of the turbine.

At step 53, a fatigue value applied to a component of the turbine over the first operating period is modelled based on the sensor signal/s. In particular, a surrogate model may be used to estimate the fatigue value when provided with the sensor signal/s as an input.

At step 54, the control strategy of the turbine is modified based on the modelled fatigue value.

The method may then start again, returning to step 51 to operate the wind turbine for a second operating period in accordance with the modified control strategy. After the second operating period, the method may proceed to steps 52 to 54, further modifying the control strategy based on a modelled fatigue value for the second operating period.

The steps of FIG. 7 may be implemented as computer program product or code being adapted to generating instructions to a controller arranged to control the operation of the wind turbine or components of the wind turbine. The computer program may be provided in any suitable manner. The computer program product is typically stored and executed by the wind turbine control system 200.

Although the present invention has been described in connection with the specified embodiments, it should not be construed as being in any way limited to the presented examples. The invention can be implemented by any suitable means; and the scope of the present invention is to be interpreted in the light of the accompanying claim set. Any reference signs in the claims should not be construed as limiting the scope.

The invention claimed is:

1. A method of operating a wind turbine, the method comprising:
operating the wind turbine over an operating period in accordance with an initial control strategy, wherein the initial control strategy comprises a first utilization ratio (UR) curve over a lifetime of the wind turbine;
receiving a sensor signal over the operating period from a sensor measuring an operational parameter of the wind turbine;
using a model to obtain a modelled fatigue value based on the sensor signal, wherein the modelled fatigue value provides an estimate of fatigue loading applied to a component of the wind turbine over the operating period, wherein the model comprises a surrogate model trained using training data, and wherein the modelled fatigue value comprises at least one correlation between operational parameters of the component and the estimate of fatigue loading applied to the component based on the training data;
determining a second UR curve over the operating period using the modelled fatigue value; and
modifying the initial control strategy based on a difference in the first UR curve during the operating period and the second UR curve to generate a modified control strategy comprising a third UR curve for a future operating period, wherein the third UR curve intersects the first UR curve at a future time value.

2. The method of claim 1, wherein the modelled fatigue value is obtained by deriving statistical data from the sensor signal, and inputting the statistical data into the model to obtain the modelled fatigue value.

3. The method of claim 1, wherein the surrogate model is trained using training data from an aero-elastic turbine load simulation.

4. The method of claim 1, wherein the method comprises determining if the modelled fatigue value differs from an expected fatigue value; and modifying the initial control strategy based on the modelled fatigue value if the modelled fatigue value differs from the expected fatigue value.

5. The method of claim 4, wherein the method further comprises:
estimating a lifetime fatigue for the wind turbine before operating the wind turbine over the operating period;
determining an expected fatigue value for the operating period based on the lifetime fatigue and a duration of the operating period; and
comparing the modelled fatigue value to the expected fatigue value to determine if the modelled fatigue value differs from the expected fatigue value.

6. The method of claim 1, further comprising defining a fatigue utilisation measure based on a difference or ratio between the modelled fatigue value and an expected fatigue value, and modifying the initial control strategy based on the fatigue utilisation measure.

7. The method of claim 1, wherein modifying the initial control strategy comprises modifying the control initial strategy to reduce a difference between the modelled fatigue value and an expected fatigue value.

8. The method of claim 1, wherein:
the operating period comprises a plurality of operating intervals; and
the modelled fatigue value is an accumulated modelled fatigue value obtained by using the model to obtain an interval fatigue value for each operating interval based on a sensor signal for that interval, and summing the interval fatigue values for each operating interval.

9. The method of claim 1, wherein the operational parameter comprises at least one of: wind speed, tower accelerations, rotor speed, pitch angle, active power, and blade root bending moment.

10. The method of claim 1, wherein the operational parameter comprises a wind parameter.

11. The method of claim 1, wherein the modelled fatigue value is for blade flap/edge wise moments, drivetrain torque, drivetrain bending moments, or tower bending moments.

12. The method of claim 1, wherein modifying the initial control strategy comprises adjusting a control setting of the wind turbine based on the modelled fatigue value.

13. The method of claim 1, wherein modifying the initial control strategy comprises adjusting a pitch response gain of the wind turbine.

14. A wind turbine, comprising:
a tower;
a nacelle disposed on the tower;
a rotor extending from the nacelle and having a plurality of blade disposed at a distal end thereof;
a control system configured to perform an operation, comprising:
operating the wind turbine over an operating period in accordance with an initial control strategy, wherein the initial control strategy comprises a first utilization ratio (UR) curve over a lifetime of the wind turbine;
receiving a sensor signal over the operating period from a sensor measuring an operational parameter of the wind turbine;
using a model to obtain a modelled fatigue value based on the sensor signal, wherein the modelled fatigue value provides an estimate of fatigue loading applied to a component of the wind turbine over the operating period, wherein the model comprises a surrogate model trained using training data, and wherein the modelled fatigue value comprises at least one correlation between operational parameters of the component and the estimate of fatigue loading applied to the component based on the training data;
determining a second UR curve over the operating period using the modelled fatigue value; and
modifying the initial control strategy based on a difference in the first UR curve during the operating period and the second UR curve to generate a modified control strategy comprising a third UR curve for a future operating period, wherein the third UR curve intersects the first UR curve at a future time value.

15. The wind turbine of claim 6, wherein the modelled fatigue value is obtained by deriving statistical data from the sensor signal, and inputting the statistical data into the model to obtain the modelled fatigue value.

16. A non-transitory computer program product comprising software code which, when executed by a data processing system, performs an operation for controlling a wind turbine, the operation comprising:
operating the wind turbine over an operating period in accordance with an initial control strategy, wherein the initial control strategy comprises a first utilization ratio (UR) curve over a lifetime of the wind turbine;
receiving a sensor signal over the operating period from a sensor measuring an operational parameter of the wind turbine;
using a model to obtain a modelled fatigue value based on the sensor signal, wherein the modelled fatigue value provides an estimate of fatigue loading applied to a component of the wind turbine over the operating period, wherein the model comprises a surrogate model trained using training data, and wherein the modelled fatigue value comprises at least one correlation between operational parameters of the component and the estimate of fatigue loading applied to the component based on the training data;

determining a second UR curve over the operating period using the modelled fatigue value; and modifying the initial control strategy based on a difference in the first UR curve during the operating period and the second UR curve to generate a modified control strategy comprising a third UR curve for a future operating period, wherein the third UR curve intersects the first UR curve at a future time value.

* * * * *